(12) United States Patent
Liang et al.

(10) Patent No.: US 12,183,051 B2
(45) Date of Patent: Dec. 31, 2024

(54) IMAGE PROCESSING METHOD, DEVICE AND APPARATUS

(71) Applicant: Inspur Electronic Information Industry Co., Ltd., Shandong (CN)

(72) Inventors: Lingyan Liang, Shandong (CN); Gang Dong, Shandong (CN); Yaqian Zhao, Shandong (CN); Qichun Cao, Shandong (CN); Haiwei Liu, Shandong (CN); Hongbin Yang, Shandong (CN)

(73) Assignee: Inspur Electronic Information Industry Co., Ltd., Shandong (CN)

( * ) Notice: Subject to any disclaimer, the term of this patent is extended or adjusted under 35 U.S.C. 154(b) by 403 days.

(21) Appl. No.: 17/615,367

(22) PCT Filed: Sep. 29, 2019

(86) PCT No.: PCT/CN2019/108958
§ 371 (c)(1),
(2) Date: Apr. 21, 2022

(87) PCT Pub. No.: WO2021/031298
PCT Pub. Date: Feb. 25, 2021

(65) Prior Publication Data
US 2023/0252757 A1    Aug. 10, 2023

(30) Foreign Application Priority Data
Aug. 16, 2019  (CN) .......................... 201910760134.6

(51) Int. Cl.
*G06V 10/28* (2022.01)
*G06V 10/48* (2022.01)
(52) U.S. Cl.
CPC .............. *G06V 10/28* (2022.01); *G06V 10/48* (2022.01)

(58) Field of Classification Search
CPC ........ G06V 10/28; G06V 10/48; G06V 40/16; G06V 10/82; G06N 3/10; G06N 3/045;
(Continued)

(56) References Cited

U.S. PATENT DOCUMENTS

| 10,789,734 B2 | 9/2020 | Pan et al. |
| 2021/0192349 A1* | 6/2021 | Lian .......................... G06T 5/60 |

(Continued)

FOREIGN PATENT DOCUMENTS

| CN | 107256422 A | 10/2017 |
| CN | 108334875 A | 7/2018 |

(Continued)

OTHER PUBLICATIONS

Written Opinion of the International Searching Authority dated May 7, 2020; International appl. No. PCT/CN2019/108958.
(Continued)

*Primary Examiner* — Emily C Terrell
*Assistant Examiner* — Ahmed A Nasher
(74) *Attorney, Agent, or Firm* — DINSMORE & SHOHL LLP

(57) ABSTRACT

An image processing method is provided. Since in the present invention, the first quantization threshold obtained by the saturated mapping method and the second quantization threshold obtained by the unsaturated mapping method are weighted, it is equivalent to fusing two quantization threshold values. The obtained optimal quantization threshold can be applied to most activations, to more effectively retain the effective information of the activations and use in subsequent image processing, thereby improving the accuracy of inference computations of the quantified deep neural network on low-bit-width hardware platforms. An image processing device and apparatus have the same beneficial effects as the above image processing method.

10 Claims, 2 Drawing Sheets

(58) Field of Classification Search
CPC .......... G06N 3/0495; G06N 3/02; G06N 3/08; G06T 9/002; G06F 18/22; G06F 2218/12
See application file for complete search history.

(56) References Cited

U.S. PATENT DOCUMENTS

| | | | | |
|---|---|---|---|---|
| 2021/0406690 | A1* | 12/2021 | Ramachandran | ...... G06N 20/10 |
| 2023/0300335 | A1* | 9/2023 | Chen | .................. H04N 19/176 |

FOREIGN PATENT DOCUMENTS

| | | | |
|---|---|---|---|
| CN | 110008952 | A | 7/2019 |
| JP | 2018040214 | A | 3/2018 |

OTHER PUBLICATIONS

International Search Report dated May 7, 2020; International Application No. PCT/CN2019/108958.

* cited by examiner

IMAGE PROCESSING METHOD, DEVICE AND APPARATUS

CROSS REFERENCE OF RELATED APPLICATION

The present application claims the priority of Chinese patent application filed with the China Patent Office on Aug. 16, 2019, with the application number of 201910760134.6 and entitled "Imaging Processing Method, Device and Apparatus", the contents of which are incorporated herein by reference in its entirety.

TECHNICAL FIELD

The present invention relates to the field of image processing, in particular to an imaging processing method, and the present invention further relates to an image processing device and apparatus.

BACKGROUND ART

Deep neural networks are increasingly used in peripheral applications for image processing (e.g., classification, detection, and recognition), but some devices in peripheral applications typically have low computing capability, moreover, the memory and power consumption are also limited, so it is very necessary to quantify models to make the models smaller and make inference faster and power consumption lower.

In the prior art, when a deep neural network is quantified, a quantization threshold is usually obtained according to a calibrated data set composed of preselected pictures and using a saturated mapping or unsaturated mapping method, and then the network model of the deep neural network can be quantified according to the obtained quantization threshold value, so as to be applied to low-bit-width target hardware device for image processing, however, both saturated mapping and unsaturated mapping are only applicable to part of the activation output layer in the deep neural network. As a result, a single method will always not be suitable for some activation output layer. These activation output layer cannot retain as many core features as possible for subsequent image processing. Therefore, when the quantified deep neural network is used for image processing, the accuracy of image processing is greatly reduced.

Therefore, how to provide a solution to solve the above technical problem is the problem to be solved by those skilled in the art currently.

SUMMARY OF THE INVENTION

The objective of the present invention is to provide an image processing method, to improve the accuracy of image processing; and another objective of the present invention provides an imaging processing device and apparatus, to improve the accuracy of image processing.

To solve the above technical problem, the present invention provides an image processing method, including:
calculating a first quantization threshold value of activation output layer in a network model of a deep neural network using a saturated mapping method according to a calibrated data set composed of pre-selected images;
calculating a second quantization threshold value of the activation output layer using an unsaturated mapping method according to the calibrated data set;
performing weighted calculation according to the first quantization threshold value and the second quantization threshold value to obtain an optimal quantization threshold value;
quantifying the network model according to the optimal quantization threshold value; and
deploying the quantified neural network to a hardware side and processing the images to be processed.

Preferably, the target hardware platform is a fixed-point computing hardware platform;
the quantifying the network model according to the optimal quantization threshold value is specifically calculating to obtain a scale factor according to the optimal quantization threshold value; and
quantifying the network model according to the scale factor in the form of a power of 2.

Preferably, the performing weighted calculation according to the first quantization threshold value and the second quantization threshold value to obtain an optimal quantization threshold value is specifically:

$$S_{sat} = \log_2 \frac{T_{sat}}{2^{n-1} - 1};$$

$$S_{no-sat} = \log_2 \frac{\frac{1}{\gamma} * T_{no-sat}}{2^{n-1} - 1};$$

$$S_{best} = \alpha * S_{sat} + \beta * S_{no-sat};$$

$$T_{best} = (2^{n-1} - 1) * 2^{ceil(S_{best})};$$

wherein T is the first quantization threshold value, $T_{no-sat}$ is the second quantization threshold value, $\gamma$ is a preset value and is greater than or equal to 1, $S_{sat}$ is the form of the first quantization threshold value with a base of 2, $\gamma$ is the form of the second quantization threshold value with a base of 2, $S_{best}$ is a scale factor, $T_{best}$ is the optimal quantization threshold value, a is the weight of the first quantization threshold value, $\beta$ is the weight of the second quantization threshold value, ceil is an upward rounding function, and n is the number of positioning bits needing to be quantified.

Preferably, the computing process of the scale factor is as follows:
calculating the candidate scale factors corresponding to each group of the combinations according to a plurality of preset $\alpha$ and $\beta$ combinations;
obtaining the optimal scale factor according to the respective cumulative probability distribution value of the candidate scale factor and the quantization error and the preset comparison standard.

Preferably, the preset comparison standard is as follows:
if the cumulative probability distribution values of a plurality of candidate scale factors are equal, then the candidate scale factor with the smallest quantization error is taken as the optimal scale factor;
if the cumulative probability distribution values of a plurality of candidate scale factors are not all equal, the candidate scale factor with the largest cumulative probability distribution value is taken as the optimal scale factor.

Preferably, the saturated mapping method is a relative entropy method or a mean-square error method.

To solve the above technical problem, the present invention further provides an image processing device, including:
a first calculation module, configured to calculate a first quantization threshold value of activation output layer in a network model of a deep neural network using a saturated mapping method according to a calibrated data set composed of pre-selected images;

a second calculation module, configured to calculate a second quantization threshold value of the activation output layer using an unsaturated mapping method according to the calibrated data set;

a third calculation module, configured to perform weighted calculation according to the first quantization threshold value and the second quantization threshold value to obtain an optimal quantization threshold value;

a quantization module, configured to quantify the network model according to the optimal quantization threshold value; and an application module, configured to deploy the quantified neural network to a hardware side and process the images to be processed.

Preferably, the target hardware platform is a fixed-point computing hardware platform;

the quantization module includes:

a fourth calculation module, configured to calculate to obtain a scale factor according to the optimal quantization threshold value; and a quantization submodule, configured to quantify the network model according to the scale factor in the form of a power of 2.

Preferably, the saturated mapping method is a relative entropy method.

To solve the above technical problem, the present invention further provides an image processing device, including:

a memory, configured to store a computer program; and a processor, configured to implement the step of the any of the above image processing methods when executing the computer program.

The present invention provides an image processing method, since in the present invention, the first quantization threshold value obtained by the saturated mapping method and the second quantization threshold value obtained by the unsaturated mapping method are weighted, it is equivalent to fusing two quantization threshold values. The obtained optimal quantization threshold value can be applied to most activation output layer, to more effectively retain the effective information of the activation output layer and use in subsequent image processing, thereby improving the accuracy of inference computations of the quantified deep neural network on low-bit-width hardware platforms.

The present invention further provides an image processing device and apparatus, with the same beneficial effects as the above image processing method.

BRIEF DESCRIPTION OF THE DRAWINGS

In order to more clearly illustrate the technical solutions in the embodiments of the present invention, the accompanying drawings to be used in the description of the embodiments or the prior art will be briefly introduced, apparently, the accompanying drawings in the following description are merely embodiments of the present invention, and other drawings can be obtained by those skilled in the art from these drawings without any creative effort.

DETAILED DESCRIPTION OF THE EMBODIMENTS

The core of the present invention is to provide an image processing method, to improve the accuracy of image processing; and another core of the present invention is to provide an image processing device and apparatus, to improve the accuracy of image processing.

In order to make the objective, technical solutions and advantages of the embodiments of the present application clearer, the technical solutions in the embodiments of the present application will be described clearly and completely below in combination with the accompanying drawings in the embodiments of the present invention, apparently, the described embodiments are a part but not all of the embodiments of the present invention. Based on the embodiments in the present invention, all the other embodiments obtained by those skilled in the art without any creative effort shall all fall within the protection scope of the present invention.

Figure 1:
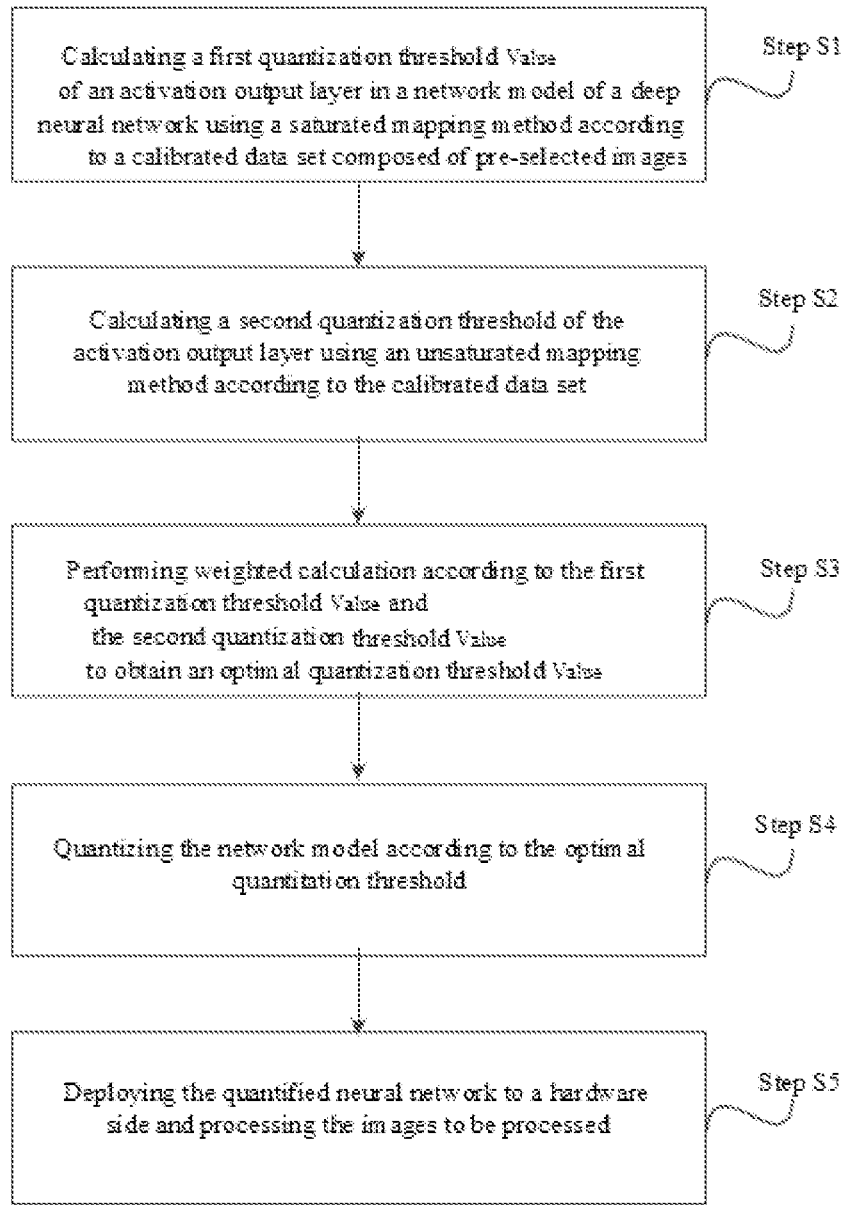
FIG. 1 is a flow diagram of an image processing method provided in the present invention.

Please refer to FIG. 1 which is a flow diagram of an image processing method provided in the present invention, including:

Step S1: calculating a first quantization threshold value of activation output layer in a network model of a deep neural network using a saturated mapping method according to a calibrated data set composed of pre-selected images;

specifically, the calibrated data set may be composed of various preselected typical pictures. For different image processing tasks and different scenarios, the preselected calibrated data set may also be different.

Specifically, current quantization techniques include linear mapping and non-linear mapping. In the present invention, the focus is on the shortcomings of the prior art in the linear mapping process and the solutions provided in the present invention. In the prior art, linear mapping mainly includes saturated mapping and unsaturated mapping. Whether it is a saturated mapping mode or an unsaturated mapping mode, the calculation of the optimal quantization threshold value will directly affect the classification/detection accuracy of the quantified model in actual operation.

Specifically, in consideration of the technical problems in the above background art, in the embodiment of the present invention, the first quantization threshold value of the activation output layer in the network model is calculated according to the calibrated data set and using the saturated mapping method, so as to provide a data basis for the calculation of optimal quantization threshold value in subsequent steps.

Step S2: calculating a second quantization threshold value of the activation output layer using an unsaturated mapping method according to the calibrated data set;

specifically, as in step S1, in consideration that the network model is quantified using the quantization threshold value calculated through the single saturated mapping method or the unsaturated mapping method in the prior art will reduce the accuracy of its image processing, the second quantization threshold value of the activation output layer can be calculated using the unsaturated mapping method in this step, in order to serve as the data base for calculating the optimal quantization threshold value in the subsequent steps.

Wherein multiple types of unsaturated mapping methods are available, for example, the unsaturated mapping method may be a maximum value quantization method, etc., which is not defined in the embodiment of the present invention.

Step S3: performing weighted calculation according to the first quantization threshold value and the second quantization threshold value to obtain an optimal quantization threshold value;

specifically, since either the saturated mapping method or the unsaturated mapping method is only applicable to some of activation output layer in the network model, for some activation output layer that are not applicable, a large number of key features cannot be retained for image processing, therefore, the total number of key features retained by the entire network model for image processing is insufficient, resulting in the reduction of image processing accuracy. In the embodiment of the present invention, the first quantization threshold value and the second quantization threshold value obtained by the saturated mapping method and the unsaturated mapping method can be calculated by a weighting method to obtain the optimal quantization threshold value, which is equivalent to the fusion of the two mapping methods, in this way, the number of retained key features may be reduced for some activation output layer, but the number of retained key features must be increased for the whole network model, so that the image processing has a higher processing accuracy.

Specifically, wherein the weights of the first quantization threshold value and the second quantization threshold value may be set in multiple methods, which is not defined in the embodiment of the present invention.

Step S4: quantifying the network model according to the optimal quantitation threshold;

specifically, the network model can be quantified according to the optimal quantization threshold value obtained after fusion, so that it can be used to a low-bit-width target hardware platform and to process the images to be processed.

Step S5: deploying the quantified neural network to a hardware side and processing the images to be processed.

Specifically, the quantified network model can be used for image processing, and the network model in the embodiment of the present invention is quantified using the optimal quantization threshold value obtained after fusing the first quantization threshold value and the second quantization threshold value (weighted calculation), so that the processing accuracy of the image to be processed is high.

Wherein the images to be processed may be images of multiple types, for example, images of human face, which is not defined in the embodiment of the present invention.

The present invention provides an image processing method, since in the present invention, the first quantization threshold value obtained by the saturated mapping method and the second quantization threshold value obtained by the unsaturated mapping method are weighted, it is equivalent to fusing two quantization threshold values. The obtained optimal quantization threshold value can be applied to most activation output layer, to more effectively retain the effective information of the activation output layer and use in subsequent image processing, thereby improving the accuracy of inference computations of the quantified deep neural network on low-bit-width hardware platforms.

On the basis of the above embodiments:
as a preferred embodiment, the target hardware platform is a fixed-point computing hardware platform;
the quantifying the network model according to the optimal quantization value is specifically as follows:
calculating to obtain a scale factor according to the optimal quantization threshold value; and
quantifying the network model according to the scale factor in the form of a power of 2.

Specifically, in order to facilitate fixed-point calculations and improve calculation efficiency, the scale factor used to quantify the network model can be expressed in the form of a power of 2, so that the displacement operation mode can be used on the hardware processing end to replace fixed-point multiplication and improve the calculation efficiency.

Of course, the scale factor may not be converted into the form of a power of 2, which is not defined in the embodiment of the present invention.

As a preferred embodiment, the obtaining the optimal quantization threshold value according to weighted calculation of the first quantization threshold value and the second quantization threshold value is specifically as follows:

$$S_{sat} = \log_2 \frac{T_{sat}}{2^{n-1} - 1};$$

$$S_{no-sat} = \log_2 \frac{\frac{1}{\gamma} * T_{no-sat}}{2^{n-1} - 1};$$

$$S_{best} = \alpha * S_{sat} + \beta * S_{no-sat};$$

$$T_{best} = (2^{n-1} - 1) * 2^{ceil(S_{best})};$$

wherein $T_{sat}$ is the first quantization threshold value, $T_{no-sat}$ is the second quantization threshold value, $\gamma$ is a preset value and is greater than or equal to 1, $S_{sat}$ is the form of the first quantization threshold value with a base of 2, $S_{no-sat}$ is the form of the second quantization threshold value with a base of 2, $S_{best}$ is a scale factor, $T_{best}$ is the optimal quantization threshold value, a is the weight of the first quantization threshold value, $\beta$ is the weight of the second quantization threshold value, ceil is an upward rounding function, and n is the number of positioning bits needing to be quantified.

Specifically, the process of calculating the optimal quantization threshold value in the embodiment of the present invention has the advantages of rapid speed and high accuracy, of course, except for the specific process in the embodiment of the present invention, the weighted calculation of the optimal quantization threshold value can also be other specific processes, which is not defined in the embodiment of the present invention.

Wherein $T_{no-sat}$ can generally take the maximum value of activation output layer, the value interval of $\gamma$ may be [1, 2], for example, may be set to 2, which is not defined in the embodiment of the present invention.

Wherein the number of positioning bits that need to be quantified can be multiple, such as 16 bit, 8 bit, 4 bit, and 2 bit, etc., which is not defined in the embodiment of the present invention.

Wherein the scale factor can be represented as multiplier $$= \frac{2^{ceil(S_{weight})} * 2^{ceil(S_{best-in})}}{2^{ceil(S_{best-out})}} = 2^x;$$

Wherein $S_{weight}$ is the scale factor of weighted value, $S_{best-in}$ is the scale factor of input feature, and $S_{best-out}$ is the scale factor of convolution output feature value.

As a preferred embodiment, the calculating process of scale factor is as follows:
calculating the candidate scale factor corresponding to each combination according to multiple preset combinations of $\alpha$ and $\beta$; and obtaining the optimal scale factor according to the cumulative probability distribution value and quantization error of each candidate scale factor and the preset comparison standard.

Specifically, the number and specific form of the preset combinations of α and β can be set independently, and the sum of α and β is not greater than 1. For example, the combination of α and β can include (0.5, 0.5), (0.4, 0.6), (0.3, 0.7), (0.2, 0.8), (0.1, 0.9), and (0, 1), etc., which is not defined in the embodiment of the present invention.

Wherein the cumulative probability distribution value and quantization error of each candidate scale factor can be calculated from the candidate optimal quantization threshold value corresponding to the candidate scale factor, that is, the candidate optimal quantization threshold value is calculated according to the candidate scale factor, and then the cumulative probability distribution value and quantization error are calculated according to the candidate optimal quantization threshold value.

Specifically, by comparing the cumulative probability distribution values and quantization errors of the candidate scale factors corresponding to each combination of α and β, the best scale factor can be selected as the optimal scale factor, and the quantization threshold value corresponding to the optimal scale factor can be taken as the optimal quantization threshold value.

Wherein since the cumulative probability distribution value and the quantization error can effectively characterize the accuracy of the network model for image processing, through these two evaluation indicators, the optimal scale factor that can improve the accuracy of image processing and its corresponding optimal quantization threshold value can be accurately found.

Of course, in addition to the cumulative probability distribution value and the quantization error provided in the embodiment of the present invention, the evaluation index may also be of other types, which is not defined in the embodiment of the present invention.

It is also worthy mentioning that the cumulative probability distribution value and quantization error corresponding to the first quantization threshold value can also be used as alternatives to be compared with the cumulative probability distribution value and quantization error of the above groups according to preset standards, if the cumulative probability distribution value corresponding to the first quantization threshold value and the quantization error are optimal, then the first quantization threshold value can be directly used as the optimal quantization threshold value, which is not defined in the embodiment of the present invention.

As a preferred embodiment, the preset comparison standard is as follows:
if the cumulative probability distribution values of a plurality of candidate scale factors are equal, then the candidate scale factor with the smallest quantization error is taken as the optimal scale factor;
if the cumulative probability distribution values of a plurality of candidate scale factors are not all equal, the candidate scale factor with the largest cumulative probability distribution value is taken as the optimal scale factor.

Specifically, if the cumulative probability distribution values are equal, it means that the image processing accuracy of the quantized network model corresponding to the candidate scale factors is roughly the same. then the possibility of errors generated in the quantization process is compared, that is, the magnitude of the quantization error, and the candidate scale factor with the smallest quantization error can be selected to improve the reliability of quantization.

Specifically, if the cumulative probability distribution values are different, the candidate scale factor with the largest cumulative probability distribution value can be taken as the optimal scale factor, to improve the accuracy of image processing, which is not defined in the embodiment of the present invention.

As a preferred embodiment, the saturated mapping method is a relative entropy method or a mean-square error method.

Specifically, the relative entropy method or the MSE (mean-square error) method have the advantages of high accuracy and fast speed.

Specifically, the process of using the relative entropy method to obtain the first quantization threshold value can be as follows: firstly the entire activation output is traversed to calculate the maximum activation output value of the activation layer, and then the value corresponding to the minimum relative entropy is searched for between 0 and the maximum activation output value and the value is taken as the first quantization threshold value.

Of course, in addition to the relative entropy method or the mean-square error method, the saturated mapping method can also be of other types, which is not defined in the embodiment of the present invention.

Figure 2:
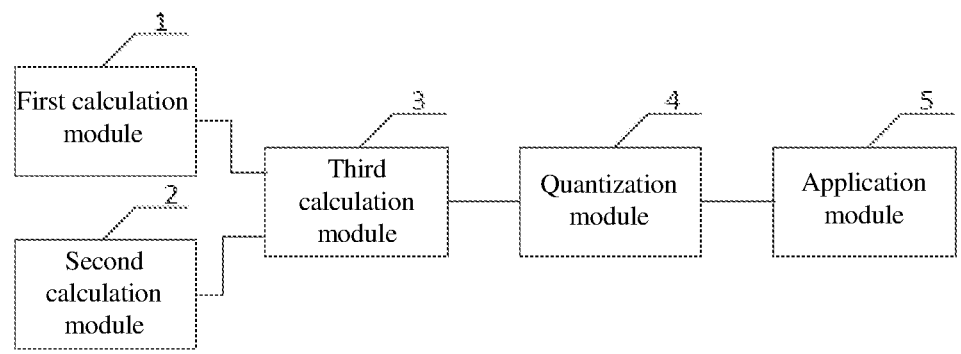
FIG. 2 is a structural schematic diagram of an image processing device provided in the present invention.

Please refer to FIG. 2 which is a structural schematic diagram of an image processing device provided in the present invention, and the image processing device includes:
a first calculation module 1, configured to calculate a first quantization threshold value of activation output layer in a network model of a deep neural network using a saturated mapping method according to a calibrated data set composed of pre-selected images;
a second calculation module 2, configured to calculate a second quantization threshold value of the activation output layer using an unsaturated mapping method according to the calibrated data set;
a third calculation module 3, configured to perform weighted calculation according to the first quantization threshold value and the second quantization threshold value to obtain an optimal quantization threshold value;
a quantization module 4, configured to quantify the network model according to the optimal quantization threshold value; and
an application module 5, configured to deploy the quantified neural network to a hardware side and process the images to be processed.

As a preferred embodiment, the target hardware platform is a fixed-point computing hardware platform;
the quantization module includes:
a fourth calculation module, configured to calculate to obtain a scale factor according to the optimal quantization threshold value; and
a quantization submodule, configured to quantify the network model according to the scale factor in the form of a power of 2.

As a preferred embodiment, the saturated mapping method is a relative entropy method.

For the introduction of the image processing device provided in the embodiment of the present invention, please refer to the method of the above image processing method, which is not repeated redundantly in the embodiment of the present invention.

Figure 3:
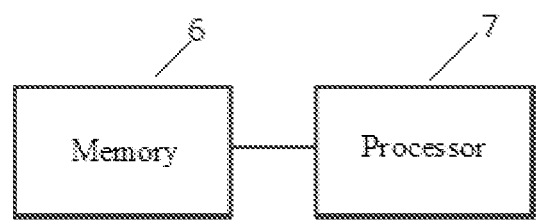
FIG. 3 is a structural schematic diagram of an image processing apparatus provided in the present invention.

Please refer to FIG. 3 which is a structural schematic diagram of an image processing device provided in the present invention, and the image processing device includes:

a memory 6, configured to store a computer program; and
a processor 7, configured to implement the step of any of the above image processing methods when executing the computer program.

For the introduction of the image processing apparatus provided in the embodiment of the present invention, please refer to the embodiment of the above image processing method, which is not repeated redundantly in the embodiment of the present invention.

Each embodiment in the present specification is described in a progressive manner, with each embodiment focusing on the differences from the other embodiments, and the same and similar parts between each embodiment can be referred to each other. For the device disclosed in the embodiment, since it corresponds to the method disclosed in the embodiment, the description is relatively simple, and for the relevant parts, please refer to the description in the method section.

It should also be noted that in the present specification, relationship terms such as first and second are merely used to distinguish one entity or operation from another entity or operation, and do not necessarily require or imply any such actual relationship or order between these entities or operations. Moreover, the terms "include", "comprise", or any other variation thereof are intended to cover non-exclusive inclusion, such that a process, method, article, or device including a set of elements includes not only those elements, but also other elements not expressly listed or also includes elements inherent to such process, method, article, or device. Without further limitation, the inclusion of an element as defined by the statement "including a . . . " does not preclude the existence of additional identical elements in the process, method, article, or device including the element.

The above description of the disclosed embodiments will be obvious to those skilled in the art to implement or use the present invention. Various modifications made to these embodiments will be obvious to those skilled in the art, and the general principles defined in this article can be implemented in other embodiments without departing from the spirit or scope of the present invention. Therefore, the present invention will not be limited to the embodiments shown in this document, but should conform to the widest scope consistent with the principles and novel features disclosed in this document.

The invention claimed is:

1. An image processing method, comprising: calculating a first quantization threshold of activation output layer in a network model of a deep neural network using a saturation mapping method according to a calibrated data set composed of pre-selected images; calculating a second quantization threshold of the activation output layer using a non-saturated mapping method according to the calibrated data set; performing weighted calculation according to the first quantization threshold value and the second quantization threshold value to obtain an optimal quantization threshold value; quantizing the network model according to the optimal quantization threshold value; and deploying the quantized neural network to a hardware side and processing the images to be processed, wherein, the performing weighted calculation according to the first quantization threshold and the second quantization threshold to obtain an optimal quantization threshold is specifically:

$$S_{sat} = \log_2 \frac{T_{sat}}{2^{n-1} - 1};$$

$$S_{no-sat} = \log_2 \frac{\frac{1}{\gamma} * T_{no-sat}}{2^{n-1} - 1};$$

$$S_{best} = \alpha * S_{sat} + \beta * S_{no-sat};$$

$$T_{best} = (2^{n-1} - 1) * 2^{ceil(S_{best})};$$

Tsat is the first quantization threshold value, Tno-sat is the second quantization threshold value, $\gamma$ is a preset value and is greater than or equal to 1, Ssat is the form of the first quantization threshold value with a base of 2, Sno-sat is the form of the second quantization threshold value with a base of 2, Sbest is a scale factor, Tbest is the optimal quantization threshold value, a is the weight of the first quantization threshold value, p is the weight of the second quantization threshold value, ceil is an upward rounding function, and n is the number of positioning bits needing to be quantized.

2. The image processing method according to claim 1, wherein, the target hardware side is a fixed-point computing hardware platform; the quantizing the network model according to the optimal quantization threshold value is specifically calculating to obtain a scale factor according to the optimal quantization threshold value; and quantizing the network model according to the scale factor in the form of a power of 2.

3. The image processing method according to claim 1, wherein, the calculating process of the scale factor is as follows: calculating the candidate scale factors corresponding to each group of the combinations according to a plurality of preset a and p combinations; obtaining the optimal scale factor according to the respective cumulative probability distribution value of the candidate scale factor and the quantization error and the preset comparison standard.

4. The image processing method according to claim 3, wherein, the preset comparison standard is as follows: if the cumulative probability distribution values of a plurality of candidate scale factors are equal, then the candidate scale factor with the smallest quantization error is taken as the optimal scale factor; if the cumulative probability distribution values of a plurality of candidate scale factors are not all equal, the candidate scale factor with the largest cumulative probability distribution value is taken as the optimal scale factor.

5. The image processing method according to claim 1, wherein, the saturation mapping method is a relative entropy method or a mean squared error method.

6. The image processing method according to claim 2, wherein, the saturation mapping method is a relative entropy method or a mean squared error method.

7. The image processing method according to claim 1, wherein, the saturation mapping method is a relative entropy method or a mean squared error method.

8. The image processing method according to claim 3, wherein, the saturation mapping method is a relative entropy method or a mean squared error method.

9. The image processing method according to claim 4, wherein, the saturation mapping method is a relative entropy method or a mean squared error method.

10. An image processing device, comprising: a memory, configured to store a computer program; and a processor, configured to implement the step of the image processing method as claimed in claim 1 when executing the computer program.

* * * * *